United States Patent [19]
Acker

[11] 3,708,647
[45] Jan. 2, 1973

[54] WELDING HEAD DRIVE UNIT
[75] Inventor: Richard C. Acker, Chagrin Falls, Ohio
[73] Assignee: The Weatherhead Company, Cleveland, Ohio
[22] Filed: March 24, 1971
[21] Appl. No.: 127,612

[52] U.S. Cl. .............219/60 A, 192/41 S, 219/125 R
[51] Int. Cl. ...............................................B23k 9/02
[58] Field of Search.........219/60 A, 60 R, 61, 125 R, 219/125 PL, 159, 124, 126; 192/41 S, 81

[56] References Cited

UNITED STATES PATENTS

| 3,534,199 | 10/1970 | Downey et al. | 219/60 A |
| 2,907,427 | 10/1959 | Dowd | 192/41 S |
| 2,888,005 | 5/1959 | Goeke | 192/41 S X |
| 2,894,111 | 7/1959 | McNutt | 219/60 A |

Primary Examiner—J. V. Truhe
Assistant Examiner—L. A. Schutzman
Attorney—McNenny, Farrington, Pearne & Gordon

[57] ABSTRACT

An in-place inert gas tube welder is disclosed which includes a head portion and a handle portion. The head portion includes a clamping means having an overcenter toggle for clamping the tubes to be welded. A sectored ring carries a nonconsumable tungsten electrode along a path adjacent the junction of the tubes to be welded. Inert gas is supplied to the welding chamber around the full 360° of the joint. A one-way clutch permits manual rotation of the sectored ring. The handle portion includes a drive motor for rotating the sectored ring, a means for supplying inert gas to the welding chamber, and a means for supplying electrical power to the electrode. An attachment means releasably secures the handle portion to the head portion. A supply cable is releasably connected to the handle portion for releasably connecting an inert gas source to the means for supplying inert gas to the welding chamber and for releasably connecting an electrical power source to the means for supplying electrical power to the electrode.

5 Claims, 9 Drawing Figures

Fig. 1

INVENTOR.
RICHARD C. ACKER
BY
McNENNY, FARRINGTON, PEARNE & GORDON
ATTORNEYS

WELDING HEAD DRIVE UNIT

BACKGROUND OF THE INVENTION

This invention relates generally to welding, and more particularly to portable nonconsumable electrode inert gas welders for in-place welding of tubing and the like.

Portable inert gas welders of the type disclosed in U.S. Pat. No. 3,534,199 are widely used for in-place welding of tubing and the like. Such welders are particularly useful for in-place welding of tubing in aircraft assembly operations, since they require very little working space around the joint to be welded and further because the weld is performed in an inert atmosphere.

Such prior art welders generally include a nonconsumable tungsten electrode which is carried by a sectored carrier ring. The tubes that are to be welded are positioned in the ring through the cut-out portion of the ring, and a drive means rotates the carrier ring to move the electrode about a path adjacent the junction of the tubes to be welded. The drive means for such prior art welders generally includes an electric motor and a speed reducing unit for reducing the speed and increasing the torque supplied by the electric motor to the electrode carrier.

It is frequently desirable to rotate the electrode carrier manually. This is because the electrode carrier may not always be stopped in a position such that the cut-out portion is directionally oriented to receive or remove the tube. Still further, the electrode may not always be at the position along the path at which it is desired to begin a weld. Such manual rotation of the electrode carrier, however, is prevented by the gear reduction unit between the drive motor and the electrode carrier. Prior attempts to overcome this problem have required a gear which is movable to a neutral position to disengage the gear reduction unit from the electrode carrier.

Still another problem associated with prior art welders relates to the clamping means for clamping the tubes that are to be welded. Such prior art clamping means generally include a stationary clamping portion secured to the body and a movable clamping portion for cooperating with the stationary clamping portion. The stationary clamping portion of such prior art welders may not be easily removed so that the welder can be used for welding tubes of various diameters, and a separate welder may be required for each tube size that is to be welded.

SUMMARY OF THE INVENTION

The present invention provides a welder which includes a drive means having a power means and a power transmission means for transmitting torque between the power means and the electrode carrier. The power transmission means includes a clutch for transmitting torque from the electrode carrier to the power means in only one direction and for interrupting transmission of torque from the electrode carrier to the power means in the other direction. In this manner, the electrode carrier may be manually rotated to any desired position without requiring a neutral position in the transmission.

In the specific embodiment, the clutch means includes a first gear means operatively connected to the power means and a second gear means operatively connected to the electrode carrier. A drive shaft is operatively connected to one of the gear means, and a coil spring is operatively connected to the other of the gears and extends around the drive shaft for transmitting torque from the first gear to the second gear only in one direction. A gear reduction unit is disposed between the clutch means and the power means so that it is disengaged by the clutch means when the electrode carrier is rotated in one direction.

In the specific embodiment, a sensing means is provided for rendering the drive means inoperable when the electrode is at a predetermined location along the path. This insures that the electrode will always be stopped at its proper position along the path for a proper weld cycle. Furthermore, the sensing means stops the electrode carrier in a position such that its cut-out portion is directionally oriented to permit insertion and removal of a workpiece. The sensing means is preferably a switch means which terminates electrical power supplied to the power means, and means to actuate the switch means when the electrode is at the predetermined location.

In the preferred embodiment, the clamping means includes a movable clamping portion and a stationary clamping portion. A link means is provided for moving the movable clamping portion, and a first attachment means releasably secures the movable clamping portion to the link means. An opening in the side of the welder body portion is provided for receiving and locating the stationary clamping portion. A second attachment means releasably secures the stationary clamping portion in the opening. In this manner, both the movable clamping portion and the stationary clamping portion may be easily changed so that various workpiece sizes may be accommodated by a single welder.

BRIEF DESCRIPTION OF THE DRAWINGS

These and other aspects and advantages of the present invention will become readily apparent upon a full understanding of the preferred embodiment shown in the drawings, wherein.

DESCRIPTION OF THE PREFERRED EMBODIMENT

Figure 1:
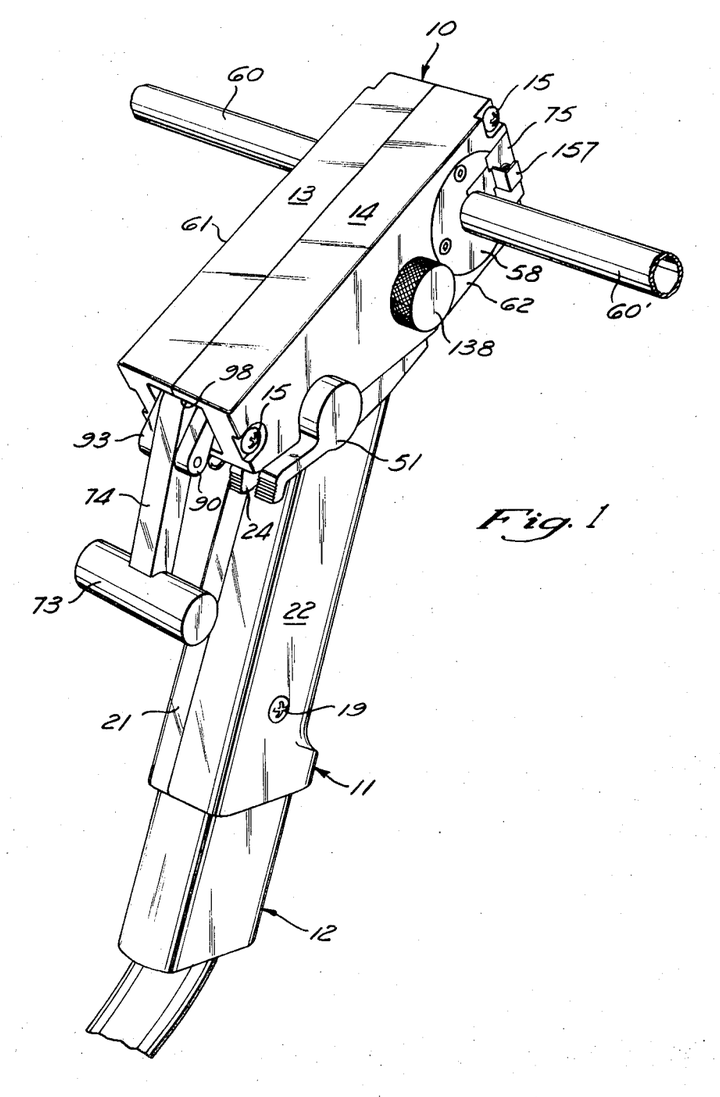
FIG. 1 is a perspective view of an inert gas welder according to the present invention with a workpiece clamped therein.

Referring now to the drawings in greater detail, FIG. 1 shows an inert gas welder having a welding head portion 10, a handle portion 11, and a supply cable 12. The welding head portion 10 includes a housing or body portion having two sections 13 and 14, which are secured together in alignment by suitable screws 15. Each section is machined to provide suitable channels and surfaces for receiving and positioning other parts of the welder and for defining portions of the welding chamber as described in detail hereinafter. The sections 13 and 14 are provided with drilled gas passages 16 and 17, respectively, for conveying inert gas supplied by the handle portion 11 to the welding chamber as explained in detail hereinafter.

Figures 8, 9:
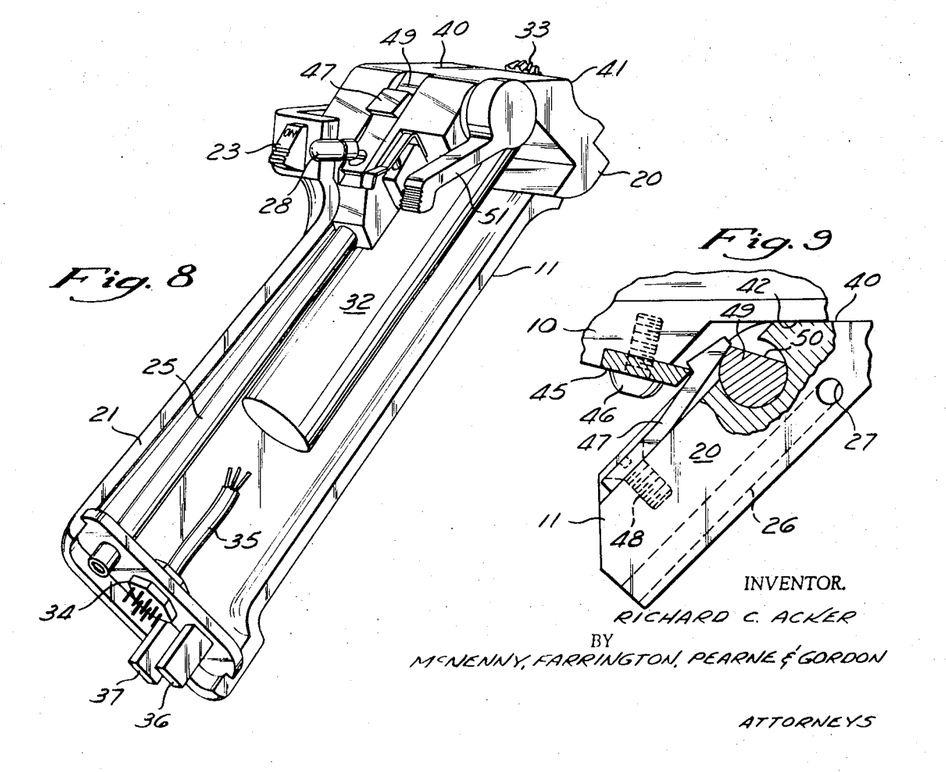
FIG. 8 is an enlarged schematic perspective view of the handle portion with portions removed for clarity.
FIG. 9 is an enlarge side elevational view of the attachment means for securing the handle portion to the body portion.

FIGS. 1, 8 and 9 show the handle portion 11. The handle portion 11 includes a main support member 20 and mating housing portions 21 and 22. The housing portions 21 and 22 are secured to the support member 20 and to one another by suitable screws 19, and provide a grip for the operator. A start switch 23 and a stop switch 24 are provided to start and stop the welding cycle in the remote electrical welding control which controls the operation of the control input to the welder. A gas passage is provided to supply inert gas to the passages 16 and 17 of the welding head portion 10 when the head portion and the handle portion 11 are connected. This gas passage includes a gas tube 25 which extends from the bottom of the handle portion 11 to the main support member 20. The gas passage further includes a passage 26 drilled in the main support member 20 from the junction of the main support member 20 and the tube 25. A transverse passage 27 is drilled laterally from side to side through the support member 20. When the head portion 10 and the handle portion 11 are connected, the transverse passage 27 is aligned with the gas passages 16 and 17 of the head portion 10 to supply inert gas thereto.

A power unit 32 is also mounted on support member 20. The power unit 32 includes a variable speed electric motor, a tachometer feedback unit for indicating the speed of the motor, and a gear reduction unit for increasing the torque and decreasing the speed of the electric motor output. A pinion gear 33 is secured to the output shaft of the gear reduction unit of unit 32 by a shear pin (not shown) to provide driving torque for the welder electrode as explained in detail hereinafter. As indicator light 28 is provided to indicate that the power supply unit 32 is actuated and that a welding cycle is in progress.

A multiple pin male connector socket 34 is provided on the bottom end of the handle portion 11. The lead wires from the socket 34 are caused within a sheath 35, and have been partially deleted from FIG. 8 for clarity. Two of the pins of connector socket 34 are utilized for supplying electrical power to the electric motor of unit 32, and other pins are used for the tachometer feedback of unit 32, start switch 23, stop switch 24, and indicator light 28. Still other pins are electrically connected to an automatic positioning limit switch as will be described in detail hereinafter. Buss bars 36 and 37 are provided to supply electrical power to the electrode and to ground the welder.

The supply cable 12 is provided to releasably connect the control equipment to the welder so that the control equipment can be used with more than one welder. The supply cable 12 is provided with a plug which is received by the lower portion of the handle portion 11, as may be understood with reference to FIG. 8. The supply cable 12 includes a gas passage for supplying inert gas from a gas source to the gas supply tube 25 and an electrical connector for connecting an electrical power source to the buss bars 36 and 37 for supplying electrical power to the electrode. The supply cable 12 further includes an electrical connector for connecting each pin of connector socket 34 to the control equipment.

An attachment device is provided to releasably secure the head portion 10 and the handle portion 11 together. In this manner, welding heads of various sizes for accommodating tubing of various size ranges may be provided without having to provide a complete welder for each such size range. Furthermore, this permits the tubing that is to be welded to be clamped in the head portion 10 without requiring the control equipment and handle portion to remain idle.

Figure 3:
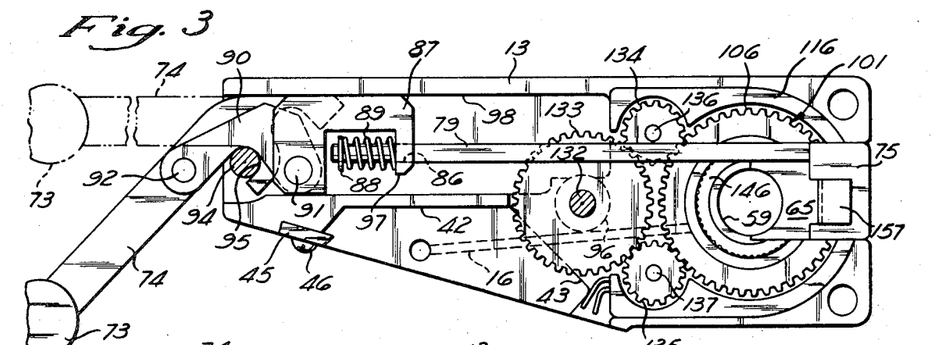
FIG. 3 is a side elevational view of the welding head with one of its housing side portions removed for clarity and with the clamp shown in the closed position.

As best seen in FIGS. 3, 8 and 9, the attachment device includes alignment surfaces for properly aligning the welding head portion 10 and the handle portion 11, and a latch. The alignment surfaces include a first alignment surface 40 and a second alignment surface 41 on the support member 20 of handle portion 11. Third and fourth alignment surfaces 42 and 43 are provided on the head portion 10 for engaging surfaces 40 and 41, respectively, to align the head and handle portions of the welder. The alignment surfaces 40 and 41 of the handle portion and the alignment surfaces 42 and 43 of the head portion are angularly related to one another to provide positive positioning of the head portion and handle portion.

The latch includes a generally flat latching plate 45 secured to the housing sections 13 and 14 of the welding head 10 by screws 46. A spring latch 47 is secured to handle portion 11 by screw 48. A latch shaft 49 extends laterally through a suitable passage formed in the support member 20 of handle portion 11. The shaft 49 is provided with a flattened portion 50 adjacent the spring latch 47. A latch handle 51 is suitably secured to the shaft 49 so that rotational movement of the handle 51 rotates shaft 49 to move spring latch 47 between its outward position of engagement with latching plate 45 and a retracted position in which it is disengaged from plate 45 to permit separation of the handle portion 11 from the head portion 10. The latching plate 45 and the spring latch 47 are permanently affixed to the head portion 10 and handle portion 11, respectively, so that there are no loose parts to be handled when the head and handle portions are separated.

The workplace clamp for securing workpieces in the welder may be best understood with reference to FIGS. 1-6. The clamp includes a stationary clamping portion, a first attachment device for releasably attaching the stationary clamping portion to the body portion, a movable clamping portion, and a second attachment device for securing the movable clamping portion to the body portion and for moving the movable clamping portion between an open position and a closed position.

The stationary clamping portion includes a left clamping member 57 and a right clamping member 58. The structural details of the clamping members 57 and 58 are similar, and the left clamping member is shown in detail in FIG. 6. The left clamping member 57 includes a stationary clamping surface 59 for engaging a tube 60 as shown in FIG. 1. The clamping members 57 and 58 are each provided with a suitable notch 56 for guiding the second attachment device as explained below. The left and right clamping members are received by suitable openings in the lateral side portions 61 and 62 of housing sections 13 and 14, respectively. The first attachment device includes screws 63 which extend through a flange portion of each clamping member 57 and 58, and which are threadably received by suitable threaded holes in the housing sections 13 and 14. In this manner, the stationary clamping members 57 and 58 may be easily removed so that replacement clamping members having clamping surfaces for accommodating a different size tubing may be inserted. Because of the relatively large mass of the clamping members 57 and 58, and since clamping members 57 and 58 contact housing sections 13 and 14, respectively, over a relatively large surface area, heat flows from the workpiece or tubes 60 and 60' to the clamping members 57 and 58 for cooling the tubes while they are being welded.

Figure 5:
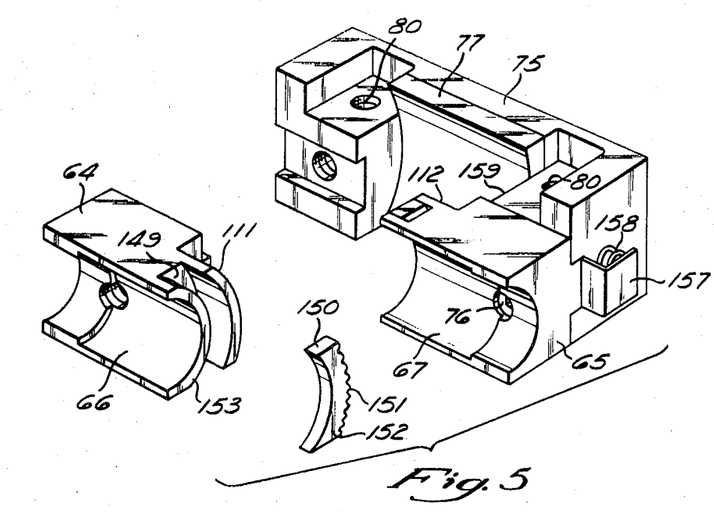
FIG. 5 is an enlarged exploded perspective view of the movable clamp showing one segment of the inert gas supply means.

The movable clamping portion includes a left clamping member 64 and a right clamping member 65. Clamping members 64 and 65 are provided with clamping surfaces 66 and 67, respectively. In the preferred embodiment, each clamping surface is a stepped surface so that the portion having the smaller radius of curvature engages the respective one of tube 60 and 60' while the portion having the larger radius of curvature engages a sleeve (not shown) which is positioned over the joint that is to be welded.

The second attachment means includes a handle and a connecting linkage. The handle includes a hand receiving portion 73 and a link portion 74. The handle is movable along a straight line path between the position shown in FIG. 4 and the position shown in phantom in FIG. 3 to move the movable clamping portion between an opened position away from from the stationary clamping portion and a closed position adjacent the stationary clamping portion. The handle is further movable along a second path between the position shown in phantom in FIG. 3 in which the workpiece clamp is closed and the position shown by solid lines in FIG. 3 to apply a clamping force. The second path is an arcuate path, as will be explained in detail hereinafter, and is angularly related to the first path at an angle of substantially 90° to minimize the working space required to move the handle to secure a workpiece in the welder.

The connecting linkage includes a movable clamp carrier member 75 to which the movable clamping members 64 and 65 are secured by suitable screws 76. A nylon insulator member 77 is cemented to the carrier 75 to minimize heat transfer through carrier 75 from the welding chamber. A left link rod 78 and a right link rod 79 are attached to carrier 75 by suitable screws which are received by threaded holes 80 of carrier 75. The link rods 78 and 79 are received and guided by the notches 56 in the stationary clamping members 57 and 58, respectively.

Figure 4:
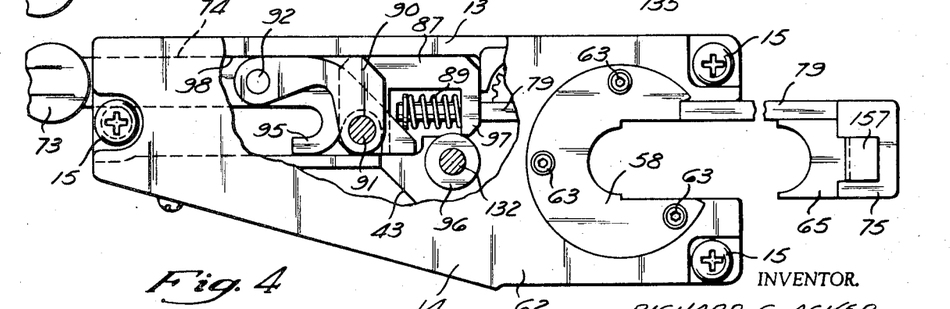
FIG. 4 is a side elevational view of the welding head with portions broken away to show the clamp linkage mechanism with the clamp in the open position.

The link rods 78 and 79 are each secured to the handle by a similar linkage. The linkage securing the right link rod 79 to the handle is best seen in FIGS. 3 and 4. The left end of link rod 79 is slidably received within a bore 86 of a drag link 87. A generally flat washer member 88 is secured on the left end of link rod 79, such as by staking, and a coil spring 89 acts between the washer 88 and the drag link 87. The drag link 87 is a generally flat member, and a generally flat toggle link 90 is disposed between the drag link 87 and link portion 74 of the handle. A first connecting pin 91 pivotally connects toggle link 90 to drag link 87, and pivotally connects a similar drag link (not shown) to a similar toggle link 93 (FIG. 1) of the linkage connecting left link rod 78 to the handle means. A second connecting pin 92 pivotally connects the toggle link 90 to the link portion 74, and pivotally connects the toggle link 93 to the link portion 74. The drag link and toggle link 93 for the left link rod 78, which are not shown in FIGS. 3 and 4 but which are substantially similar to drag link 87 and toggle link 90, as well as about one-half of link portion 74, are slidably disposed in a cut-out passage 98 of the left housing section 13. In a similar manner, the drag link 87 and toggle link 90 are slidably disposed in a cut-out passage (not shown) of the right housing section 14. A pivot pin 94 extends laterally between housing sections 13 and 14. A hook portion 95 is provided on link portion 74 for engaging pivot pin 94 when the movable clamping portion is in its closed position.

Figure 2:
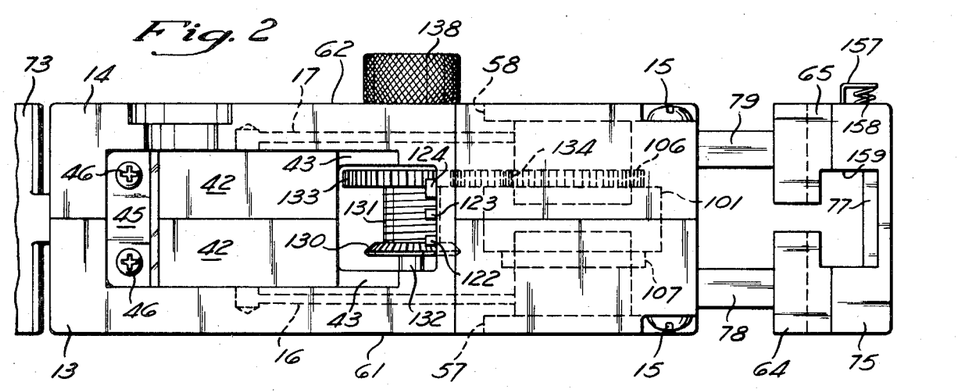
FIG. 2 is a bottom view of the welding head shown in FIG. 1 with the handle portion removed and with the clamp shown in the open position.

When the workpieces have been positioned within the opened clamp as shown in FIG. 2, the handle is moved along the first path from the position shown in FIG. 2 to the position shown in phantom in FIG. 3. This brings the clamping surfaces of the movable clamping portion to a closed position adjacent the clamping surfaces of the stationary clamping portion to encapsulate the workpieces on each side of the joint that is to be welded. With the handle in this position, the hook portion 95 engages pivot pin 94. The handle is then moved from the position shown in phantom in FIG. 3 along a second path to the position shown by solid lines in FIG. 3. When this occurs, the handle and hook portion 95 pivot about the pivot pin 94 and the force applied to the handle is transmitted to toggle link 90 by connecting pin 92 and to drag link 87 by connecting link 91. Because the right link rod 79 is slidably disposed in bore 86, the force is then transmitted through spring 89 to washer 88 and link rod 79. In this manner, the coil spring 89 applies the clamping force to the workpiece so that a substantially constant clamping force is applied regardless of minor variations in diameter of the workpiece.

As the movable clamp is moved from its opened position to its closed position and the handle is moved along the first path, the manual force applied to the handle is transmitted directly to the movable clamp. However, this force applied to the handle is multiplied to apply a substantially greater clamping force when the movable clamp is in its closed position because of the toggle action produced when the handle is moved along the second path. As a result, the greater movement of the handle required by the mechanical advantage yielded by the connecting linkage occurs only when the movable clamping portion is in its closed position to minimize the working space required to actuate the handle. Also, the linkage is arranged such that the distance between the pivot pin 94 and the hand receiving portion 73 is greater than the distance between the pivot pin 94 and the connecting pin 92 to produce a mechanical advantage greater than that produced by the toggle action of link portion 74 and toggle link 90.

When the handle is in the closed position shown in FIG. 3, the connecting linkage also locks the movable clamps 64 and 65 in the closed position. To accomplish this, the connecting pin 92 is arranged such that it moves from a position vertically above the center of the pivot pin 94 to an overcenter position vertically below the center of pivot pin 94 when the handle is moved along its second path. Since the force applied to the connecting pin 92 by the toggle links 90 and 93 is exerted in a horizontal direction as viewed in FIG. 3, the clamping force can pull the handle to the right only when the connecting pin 92 is vertically above the pivot pin 94. Because of this, the travel of the connecting pin 92 over the center of the pivot pin 94 locks the movable clamps 64 and 65 in the closed position.

A bushing 96, which provides a bearing for a drive shaft as will be explained in detail hereinafter, projects slightly into the cut-out passage 98 as seen in FIGS. 3 and 4. When the movable clamping portion is in its opened position as shown in FIGS. 2 and 4, an end portion 97 of drag link 87 compresses and passes over the projecting portion of bushing 96. In this manner, a detent is provided to hold the movable clamping portion in its opened position without interferring with the operation of the handle or linkage during any other portion of their operation.

Figure 7:
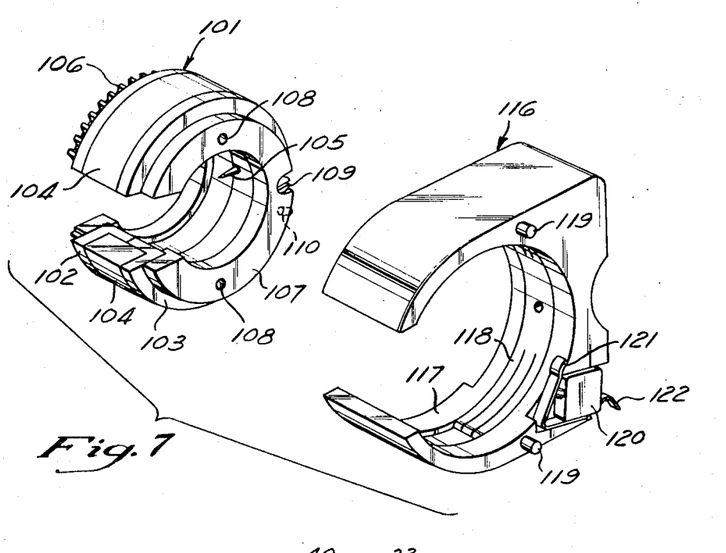
FIG. 7 is an enlarged exploded perspective view of the electrode carrier and the carrier retainer.

The preferred embodiment further includes an electrode carrier 101, the structural details of which are best seen in FIGS. 2, 3 and 7. The electrode carrier 101 includes two sections 102 and 103 formed of a strong, high temperature resistant insulating material such as boron nitride or other refractory material. An electrode shoe 104 of conducting material such as beryllium copper is disposed about the outside periphery of the carrier sections 102 and 103. A non-consumable electrode 105 of tungsten or the like is electrically connected to the shoe 104 and projects radially inwardly through the ceramic sections 102 and 103. A carrier gear 106 is disposed on the side of carrier section 102, and a spacer member 107 is disposed on the side of carrier section 103. Connector pins 108, preferably of filled nylon or teflon, extend laterally through carrier sections 102 and 103, carrier gear 106 and spacer 107 and are held in place by suitable cement or adhesive to retain the various component parts of the electrode carrier in their proper positions. An adjustment screw 109 is threadably received by a lateral hole in the electrode shoe 104. The screw 109 secures the electrode in place and may be loosened to permit removal or adjustment of the electrode 105. An actuating pin 110 projects from the exposed lateral side portion of section 103 to actuate a sensing device when the electrode is in a predetermined position, as will be explained in detail hereinafter.

The electrode carrier 101 is rotatably journaled within a carrier retainer 116. The carrier retainer 116 is of nylon in the preferred embodiment, and includes an opening 117 for receiving the carrier 101. A flexible brush 118 is provided to supply electrical power to the electrode shoe 104 and electrode 105. Locating pins 119 project into suitable holes (not shown) of housing section 13 to properly locate and position the carrier retainer 116. A limit switch 120 is disposed on retainer 116 and is provided with a resilient actuating arm 121. The actuating arm 121 is arranged in interferring relation with actuating pin 110, so that the limit switch 120 is actuated by pin 110, when the electrode carrier 101 is in the position shown in the drawings. A first switch buss bar 122 is arranged on the carrier retainer 116 to engage a suitable electrical connector (not shown) on main support member 20 when the head and handle portions are joined together. The first electrical connector is electrically connected to one of the pins of socket 34. A second buss bar 123 (see FIG. 2) is arranged on carrier retainer 116 to engage a second electrical contact (not shown) on support member 20. The second electrical contact is electrically connected to another of the pins of socket 34. A third buss bar 124 is arranged on the carrier retainer 116 to engage a third electrical contact (not shown) on support member 20. The third electrical contact is also connected to one of the pins of socket 34. The first buss bar 122 and second buss bar 123 are electrically connected to the two terminals of limit switch 120. The third buss bar 124 is electrically connected to the brush 118 to supply electrical power to electrode 105.

As may be best seen in FIG. 2, the stationary clamping members 57 and 58 and the movable clamping members 64 and 65 extend through the annular carrier gear 106 and the annular spacer member 107, respectively. In this manner, the cylindrical exterior surface of the stationary clamping members 57 and 58 cooperates with the cylindrical exterior surfaces 111 and 112, respectively, of the movable clamping members to provide a continuous cylindrical journal for the electrode carrier 101 as it rotates.

The drive train for driving the electrode carrier 101 is best seen in FIGS. 2, 3, 7 and 8. As explained above, pinion 33 is connected to the drive shaft of motor unit 32 by a shear pin. When handle portion 11 is connected to the welding head 10, pinion 33 engages a bevel gear 130 which is rotatably mounted on a drive shaft 132. A helical clutch spring 131 is secured to bevel gear 130 and is coiled about the drive shaft 132. One end of the drive shaft 132 is rotatably journaled in bushing 96 of housing section 13, and the other end of the drive shaft 132 is rotatably journaled in a similar bearing (not shown) in housing section 14. A spur gear 133 is suitably connected to drive shaft 132 for rotational movement therewith. The free end of clutch spring 131 is adjacent spur gear 133 but is not connected thereto. Idler gears 134 and 135 are rotatably journaled on shafts 136 and 137, respectively, which are disposed on the carrier retainer 116. Each idler gear 134 and 135 engages both spur gear 133 and carrier gear 106 to transmit driving torque therebetween and to preclude preclude interruption of torque transmission from gear 133 to carrier gear 106 when the opened portion of the sectored carrier gear 106 is adjacent one of the idler gears 134 or 135. One end of the drive shaft 132 projects through right housing section 14, and a knurled knob 138 is suitably secured thereto.

When motor unit 32 is supplied with electrical power, it provides driving torque for pinion 33 and bevel gear 130. As bevel gear 130 is rotated, it begins to rotate spring 131 in a direction to wrap the spring 131 more tightly on shaft 132 to rotate the shaft 132 therewith. This transmits the drive torque to the spur gear 133. Idler gears 134 and 135 transmit the drive torque from spur gear 133 to carrier gear 106 to rotate electrode carrier 101. This moves the electrode 105 along a circular path adjacent the junction of the workpieces that are to be welded.

If for any reason the electrode carrier is stopped in a position other than the open position shown in the drawings wherein the movable clamp may be opened to permit insertion of a workpiece, it may be desired to manually rotate the carrier 101 back to its opened position. However, the gear reduction unit of the power unit 32 precludes manual rotation of the drive motor through pinion 33. As best seen in FIG. 2, when the knurled knob 138 is rotated in a direction such that any friction between shaft 132 and coil spring 131 tends to unwind the spring, the spring 131 effectively disconnects the bevel gear 130 and motor unit 32 from shaft 132 to permit rotating torque to be applied to carrier gear 106 through spur gear 133. This provides a clutch to permit such manual rotation of the electrode carrier 101 without requiring a neutral position in the drive train gear unit.

Figure 6:
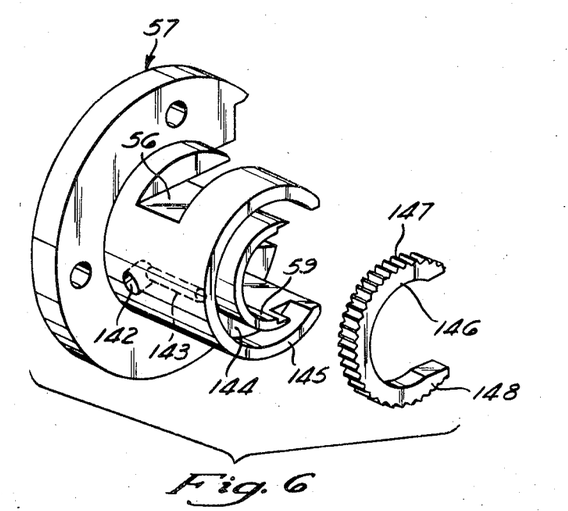
FIG. 6 is an enlarged exploded perspective view of the stationary clamp showing the other segment of the inert gas supply means.

As explained above, the supply cable 12 includes a gas passage to interconnect an inert gas source with tube 25 of the handle portion 11. The gas is then conveyed through tube 25 to passages 26 and 27 of support member 20. From passage 27, the inert gas is then conveyed to passages 16 and 17 in housing sections 13 and 14, respectively. The structure for conveying the inert gas from passages 16 and 17 to the welding chamber is best seen in FIGS. 2, 5 and 6. The left stationary clamping member 57 is provided with a passage 142 which extends radially inwardly from its outer periphery to intersect a transverse passage 143. The transverse passage 143 extends to an annular groove 144 in the radial side wall 145 of the clamping member 57. An annular distributing member segment 146 having a notched external periphery 147 is received by annular groove segment 144 so that its radial side wall 148 is aligned with radial side wall 145. The thickness of distributing member segment 146 is less than the depth of groove 144 so that a segment of an annular manifold is defined between the bottom portion of groove 144 and a sidewall portion of distributing member 146. In a similar manner, an annular groove segment 149 is provided in left movable clamping member 64 for receiving an annular distributing member segment 150. The segment 150 includes a notched external periphery 151. The thickness of the distributing member segment 150 is less than the depth of annular groove 149, so that a segment of an annular manifold is defined between the distributor segment 150 and the bottom of the annular groove 149 when the radial sidewall 152 of segment 150 is aligned with the radial sidewall 153 of left clamping member 64.

When the movable clamping portion is in the closed position, the above described manifold segment of stationary clamping member 57 will be aligned with the above described manifold segment of clamping member 64. This permits the inert gas to be supplied to the welding chamber through the notched portions of the distributor segments 146 and 150. An identical inert gas supply structure is provided in right clamping members 58 and 65. By introducing the inert gas into the welding chamber through sidewall portions of the workpiece clamp, the inert gas is introduced immediately adjacent the path of the electrode to remove hot gases and contaminates from the inlet location adjacent the electrode path. Furthermore, this provides a structure for introducing the inert gas along the entire electrode path at both sides of the electrode to insure a uniform welding atmosphere and a uniform gas cooling of the weld.

As best seen in FIGS. 2 and 5, an indicator tab 157 is slidably received between the right clamping member 65 and the clamp carrier member 75. A coil spring 158 biases the indicator tab 157 to its outward position shown in the drawings. The portion of the indicator tab 157 which is received between the clamping member 65 and the clamp carrier member 75 extends to the inner surface 159 of the clamp carrier 75. When the movable clamping portion is closed and it is desired to determine if the electrode carrier 101 is in the opened position shown in the drawings, the indicator tab 157 is manually pressed inwardly. If the electrode carrier is in the position shown in the drawings, the portion of the indicator tab 157 adjacent the inner surface 159 will project into the removed portion of the sectored carrier 101 to permit the indicator tab 157 to be pressed inwardly. However, if the carrier 101 is not in this position, the portion of the indicator tab adjacent the inner surface 159 will contact the carrier 101 and preclude such inward movement of the tab 157.

To operate the inert gas welder shown in the drawings, the welding head 10 may be separated from the handle portion 11 at the completion of a prior weld so that the handle portion 11 may be used with another welding head while a workpiece is being clamped in the welding head 10. With the welding head so separated, tubes 60 and 60' are inserted in the opened clamping means shown in FIGS. 2 and 4. If desired, a sleeve may be placed about the joint that is to be welded in a well-known manner. The handle is moved along its first path from the position shown in FIGS. 2 and 4 to the position shown in phantom in FIG. 3 to close the movable clamps 64 and 65. The handle is then moved along its second path from the position shown in phantom in FIG. 3 to the position shown by solid lines in FIG. 3. This applies a predetermined clamping force to the workpieces and locks the movable clamps 64 and 65 in the closed position. An inert gas supply is connected to the free end of the tube 60, and a restricted orifice is connected to the free end of tube 60' to provide an inert gas atmosphere inside of the tube.

The handle portion 11 and supply cable 12 are then connected to the welding head 10 to connect the control equipment (not shown) to the welding head 10. The control equipment, in a well-known manner, includes an inert gas supply, an electrode power supply, and a motor power supply. Prior to the commencement of a welding cycle, the inert gas supply control purges the welding chamber with an inert gas such as argon and then supplies a steady flow of inert gas to the welding chamber throughout the weld. The gas escapes through various clearances of the welding head, such as the clearances between the clamp carrier 75 and the housing sections 13 and 14.

Once the welding chamber has been purged, the electrode power supply is actuated to establish an arc. In a typical welding cycle, the motor power supply then provides a substantially constant direct current voltage to the motor to run the motor at a substantially constant speed and rotate the electrode carrier 101 at a substantially constant speed. With the electrode rotating at a substantially constant speed, and after an arc has been established, the electrode power supply begins to increase the electrode current until a desired steady state current has been obtained. The steady state motor speed and electrode current then continue for a predetermined time, such as the time required for one complete rotation of the electrode carrier 101. Toward the end of the welding cycle, the speed of the motor is increased while the electrode current remains the same. Finally, the motor speed is increased still more while the electrode current is decreased to zero during a run-out portion of the cycle to produce an even weld. The welding cycle may extend over any desired time period, such as that required for two or three revolutions of the electrode carrier. Although a typical welding cycle has been described, various relationships between the electrode current and the electrode carrier speed and the rate of change of each may be used, depending upon the particular workpiece that is to be welded and the type of inert gas that is used. When the end of the welding cycle is reached and the electrode carrier 101 returns to its open position, the actuating pin 110 actuates limit switch 120 to stop the electrode carrier. The handle portion 11 may then be removed from the welding head 10 so that the handle portion 11, the supply cable 12 and the control equipment may again be used to operate another welding head. The workpiece clamp is then opened, and the workpiece removed therefrom.

Although a specific embodiment of the invention has been shown and described in detail, various modifications and rearrangements may be made without departing from the scope of the invention defined by the following claims.

I claim:

1. An inert gas welder comprising a body portion, a welding chamber, an electrode, a rotatable carrier means for carrying said electrode along a path, a clamping means for clamping a workpiece to be welded adjacent said path, an electric drive motor, a power transmission means including a spring clutch means for transmitting torque from said drive motor to said carrier means to rotate said carrier means, a manual rotation means for manually rotating said carrier means, and said spring clutch means interrupting transmission of torque from said manual rotation means to said electric drive motor when said carrier means is rotated by said manual rotation means.

2. An inert gas welder as set forth in claim 1 wherein said spring clutch means includes first gear means operatively connected to said electric motor, second gear means operatively connected to said carrier means, drive shaft means operatively connected to one of said gear means, and coil spring means extending around said drive shaft means and operatively connected to the other of said gear means for transmitting torque from said first gear means to said second gear means only in one direction, and said manual rotation means being operatively connected to said drive shaft means.

3. An inert gas welder as set forth in claim 1 wherein said power transmission means includes torque increasing means between said electric motor and said spring clutch means for increasing the torque from said electric motor applied to said carrier means.

4. An inert gas welder as set forth in claim 1 including sensing means for rendering said power means inoperative when said electrode is at a predetermined location along said path.

5. An inert gas welder as set forth in claim 4 wherein said sensing means includes switch means for terminating electrical power supplied to said electric motor and means carried by said carrier means for actuating said switch means when said electrode is at said predetermined location.

* * * * *